(No Model.) 7 Sheets—Sheet 1.

F. H. RICHARDS.
WEIGHING MACHINE.

No. 585,968. Patented July 6, 1897.

Witnesses
Chas. F. Schmelz
Fred. J. Dole.

Inventor
F. H. Richards.

(No Model.)

F. H. RICHARDS.
WEIGHING MACHINE.

No. 585,968.   Patented July 6, 1897.

7 Sheets—Sheet 3.

Witnesses
Chas. R. Schmelz
Fred. J. Dole.

Inventor
F. H. Richards.

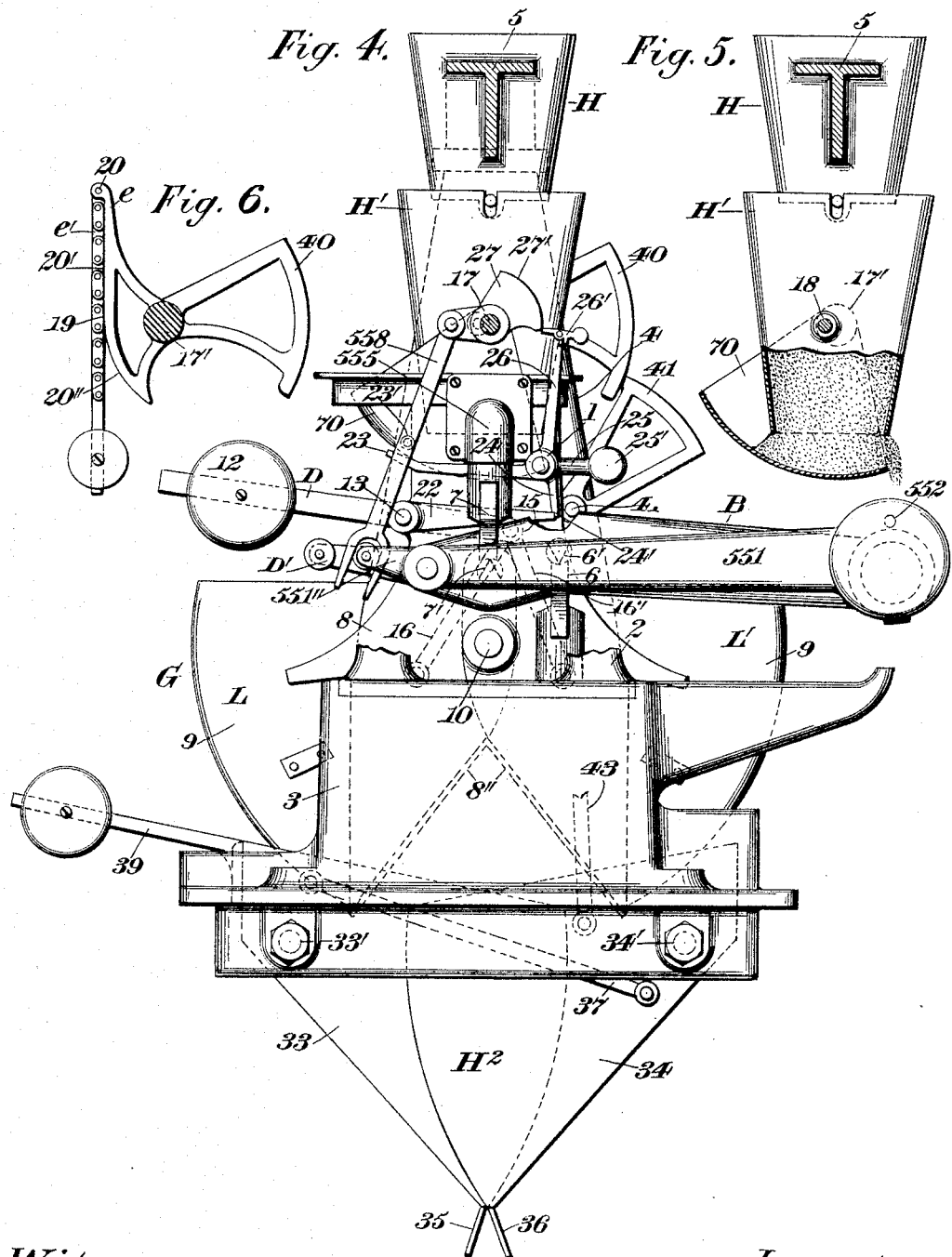

(No Model.) 7 Sheets—Sheet 5.
F. H. RICHARDS.
WEIGHING MACHINE.
No. 585,968. Patented July 6, 1897.
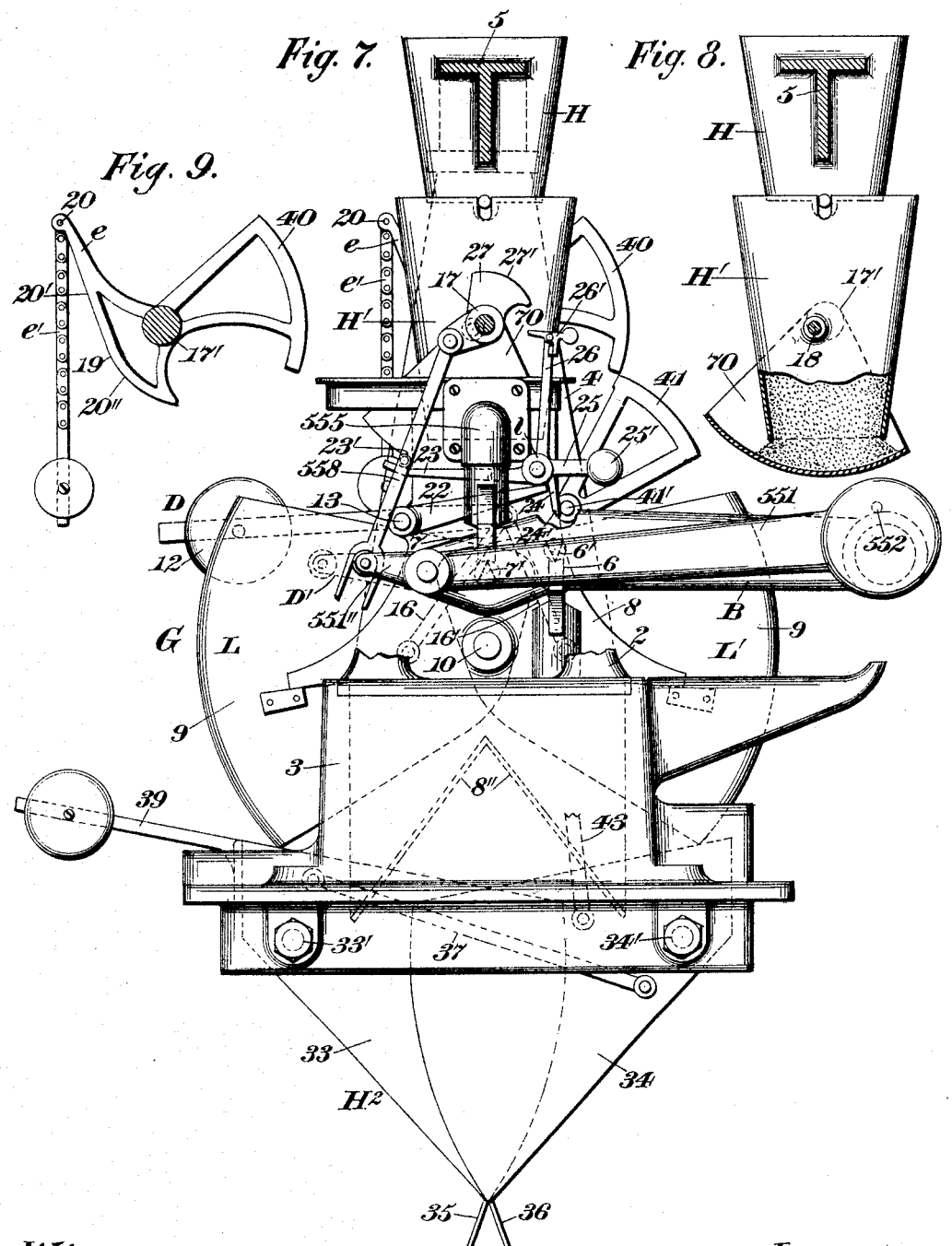
Witnesses
Chas. L. Schmelz
Fred. J. Dole.
Inventor:
F. H. Richards.

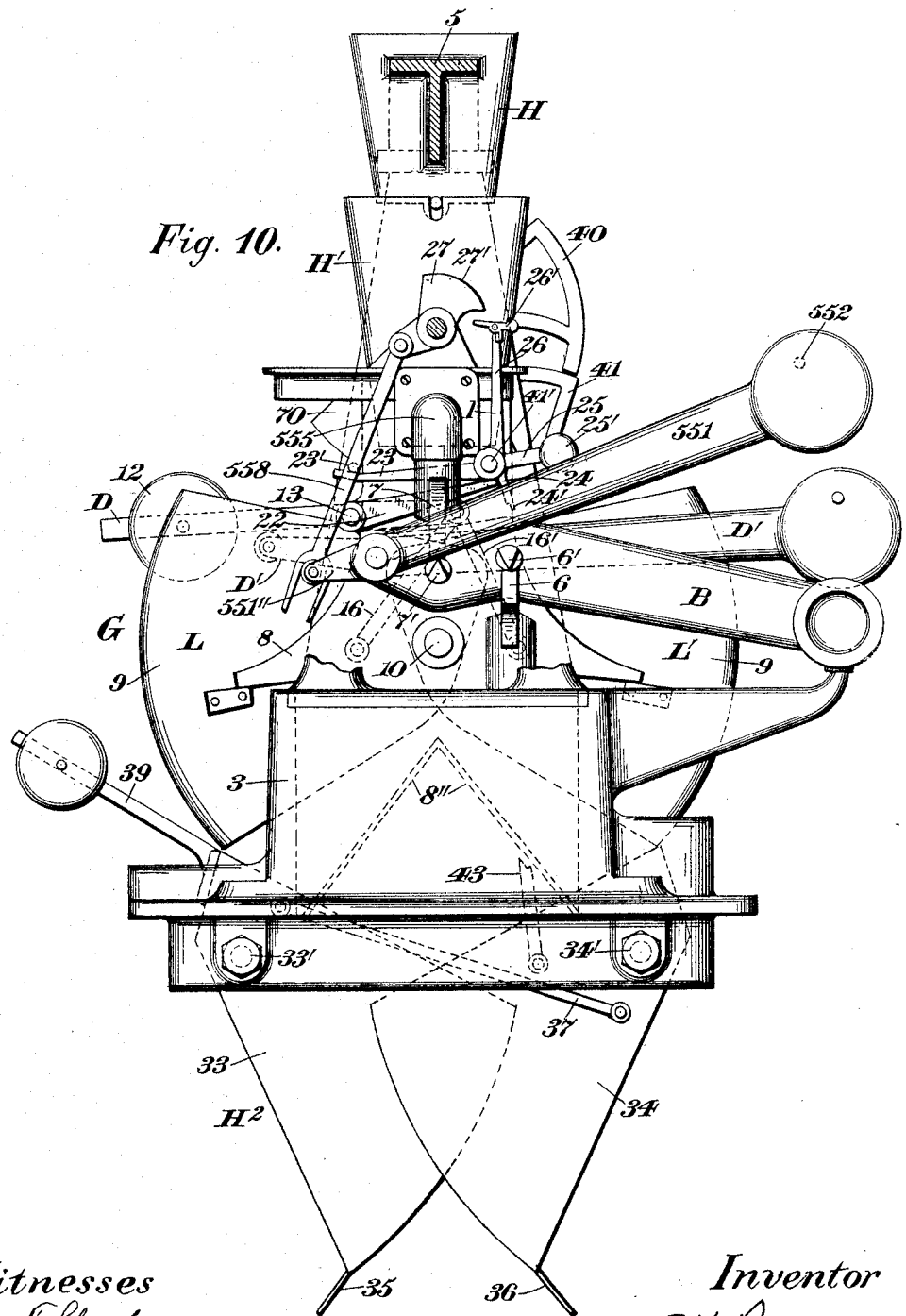

(No Model.)

F. H. RICHARDS.
WEIGHING MACHINE.

No. 585,968. Patented July 6, 1897.

Witnesses
Chas. F. Schmelz
Fred J. Dole.

Inventor
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,968, dated July 6, 1897.

Application filed November 5, 1896. Serial No. 611,156. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, and particularly to that class of weighing-machines adapted for weighing out predetermined quantities of grain or other free-flowing materials, one object of the invention being to provide in a weighing-machine improved stream-controlling mechanism embodying a valve and novel valve-actuating means for imparting to the valve a closing movement of relatively-varying velocities at different points in the length of said movement, whereby a gradual and precise reduction of the supply-stream at successive points in the operation of the machine may be effected with the least frictional resistance, and consequently with the minimum amount of power, and, further, to provide, in connection with said stream-controlling mechanism, a supply-chute supported by said mechanism and effective for accelerating the closing movement of the valve without changing the ratio of variations in velocities.

A further object of the invention is to provide, in connection with the beam mechanism of the weighing-machine, an improved bucket or load-receiver having a closer and to provide in connection with said closer a closer-actuator adapted for directly imparting an opening movement to said closer coincidently with the complete closing movement of the stream-controller.

A further object of the invention is to provide means in coöperative relation with the closer-actuator for effecting a closer-shutting movement of said actuator immediately succeeding the discharge of the load and also an improved regulator-hopper and means in connection with said hopper for controlling the closing movement of the bucket-closer actuator and also for controlling the opening movement of the valve or stream-controller.

Figure 1:
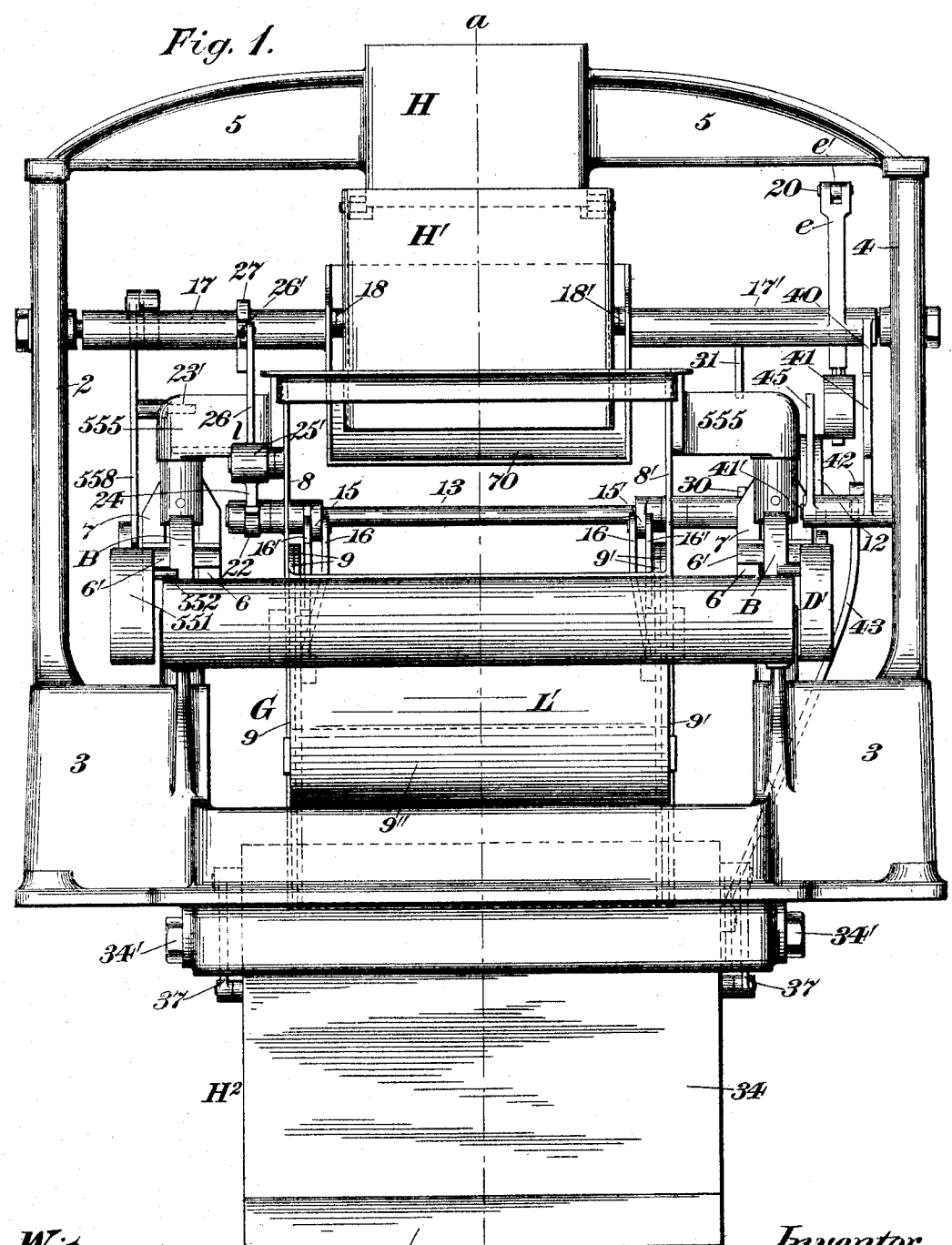
Figure 2:
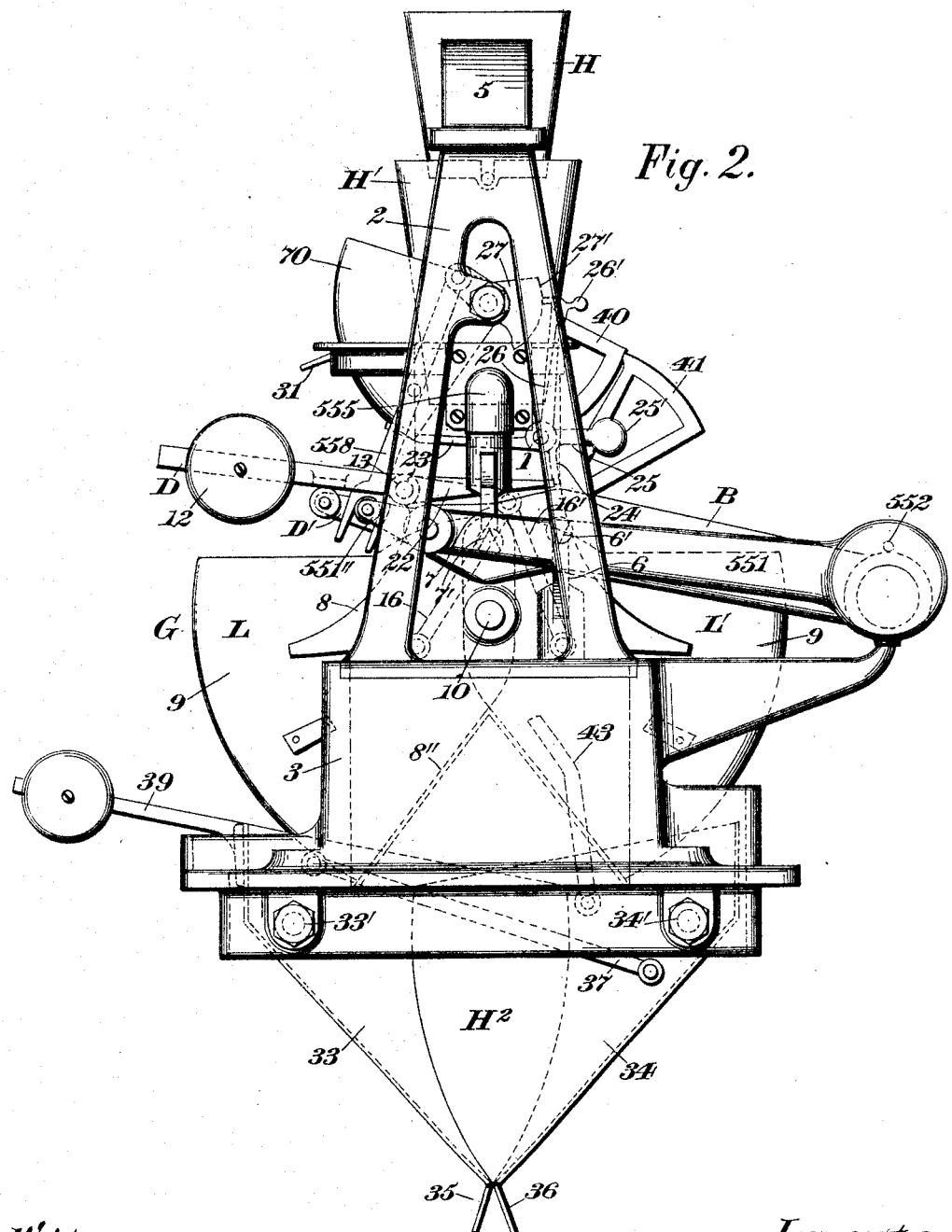
Figure 3:
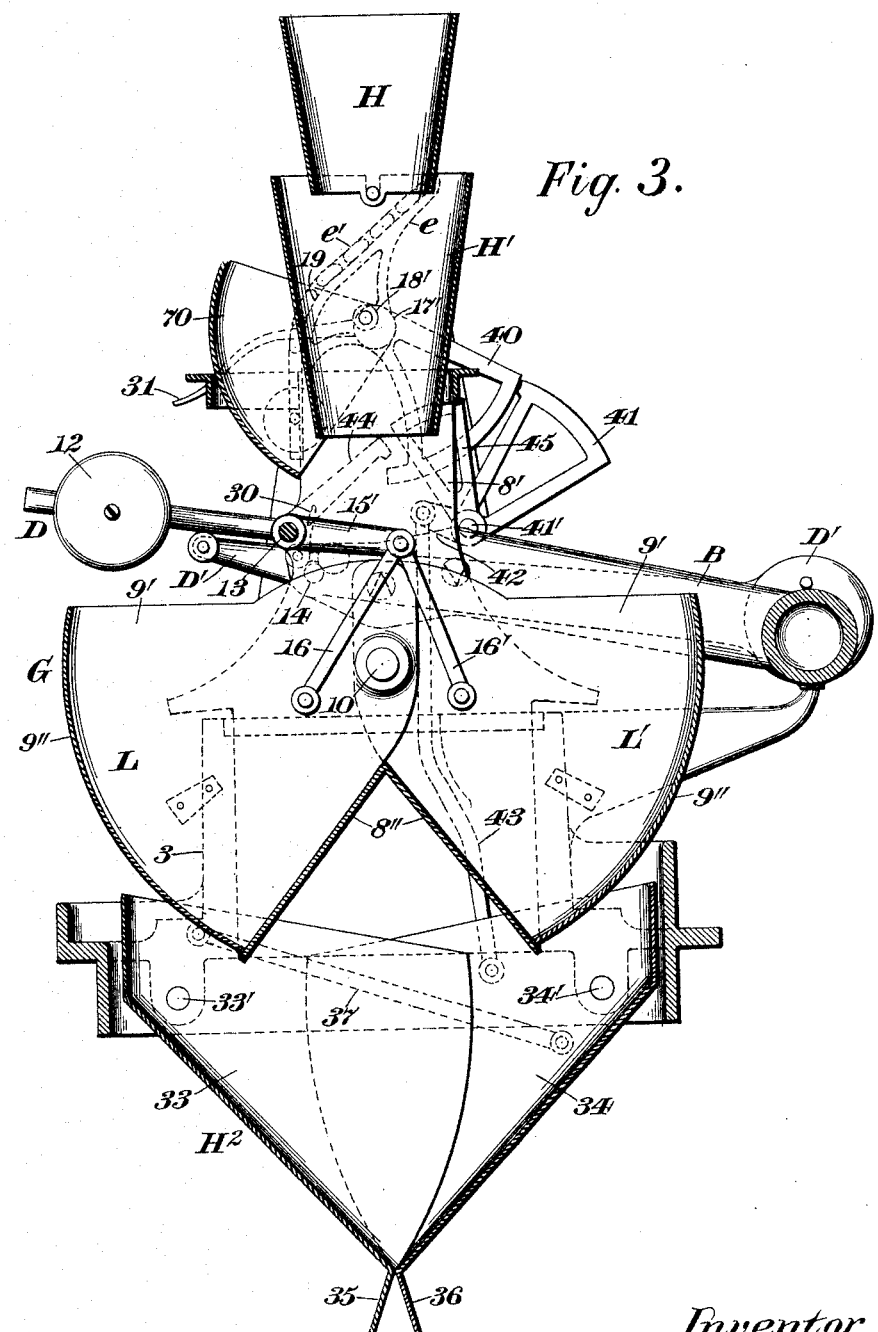
Figure 12:
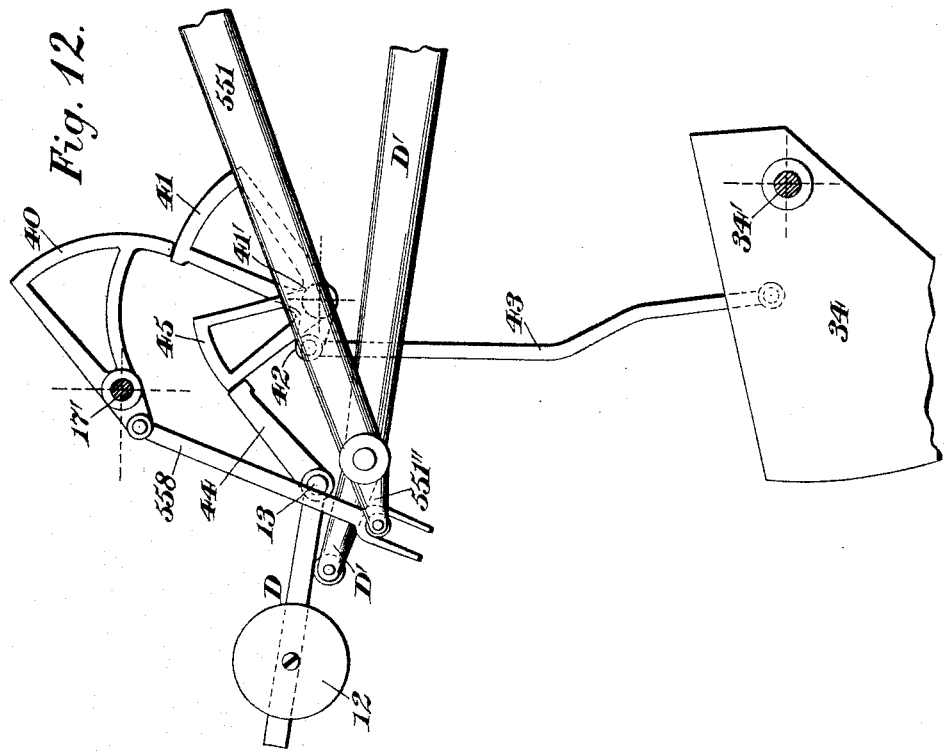
Figure 11:
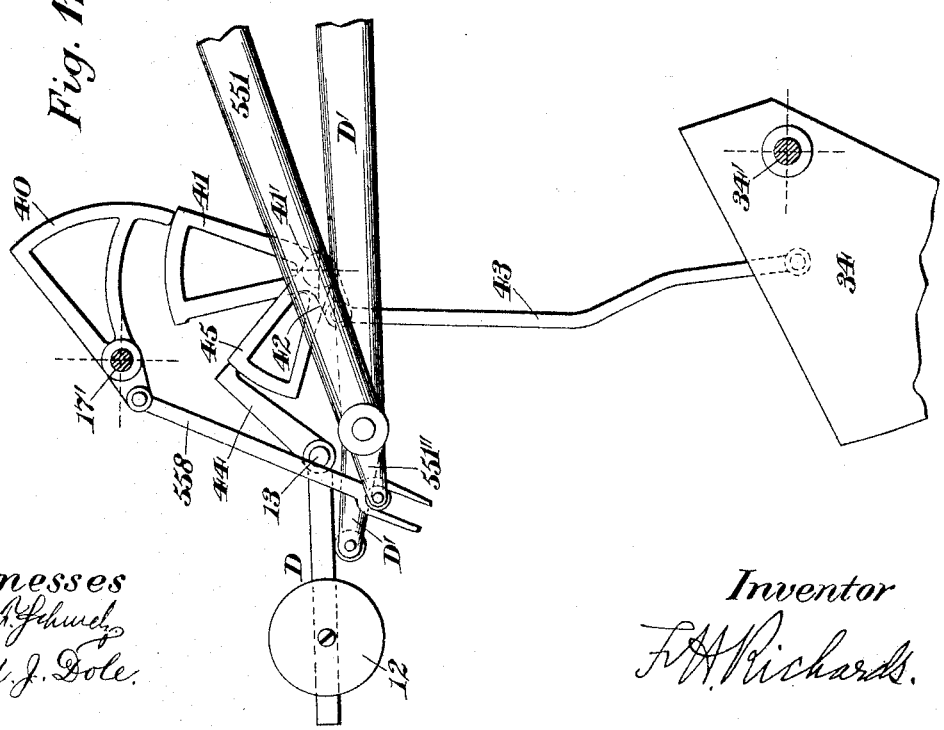

In the drawings accompanying and forming part of this specification, Figure 1 is a front elevation of the weighing-machine embodying my present improvements, the parts thereof being shown in the position illustrated in Fig. 2. Fig. 2 is an end elevation as seen from the left in Fig. 1, the operative parts of the machine being in the positions they occupy at the commencement of the weighing operation, the stream-controller being in its wide-open position, the bucket being in its poised position with the closer thereof closed, and the regulator-hopper being in its closed position. Fig. 3 is a vertical longitudinal section of the machine, taken in dotted line $a\ a$, Fig. 1, as seen from the left in said figure and showing the parts in positions corresponding to the positions thereof shown in Fig. 2. Fig. 4 is an end elevation similar to Fig. 2, showing the parts of the machine in the positions they occupy when the bucket is near the last stage of its descending movement and when the stream-controller is in its drip position, part of the framework of the machine being broken away more clearly to illustrate certain details of the weighing-machine. Fig. 5 is a sectional end view of the supply apparatus and stream-controller, showing the stream-controller in its drip position. Fig. 6 is a similar view of the stream-controller actuator, showing the same in the position it occupies when the stream-controller is in the position shown in Fig. 5. Fig. 7 is an end view similar to Fig. 4, showing the parts of the weighing-machine in the positions they occupy when the stream-controller or valve is fully closed and the bucket is in the position for discharging the load. Fig. 8 is a view similar to Fig. 5 of the supply apparatus and the stream-controller and showing said stream-controller in its fully-closed position. Fig. 9 is a view similar to Fig. 6 of the actuating device for stream-controller and showing said device in the position corresponding to the position it occupies when the stream-controller is in its fully-closed or stream-cut-off position. Fig. 10 is an end view similar to Figs. 4 and 7, showing the parts of the weighing-machine in the positions they occupy when the valve is fully closed and the bucket and regulator-hopper are in their load-discharging positions. Fig. 11 is a detail of a portion of the weighing mechanism, showing a part of the regulator-hopper, the bucket-closer actuators, and the coöperative locking devices controlled by the movements of the regulator-hopper and showing said locking devices in the positions they occupy when the valve is in its closed position and when the bucket-closers and regulator-hopper are in their open positions; and Fig. 12 is a similar view of the mechanism shown in Fig. 11, showing the interlocking devices in the positions they occupy just preparatory to the complete closing movement of the regulator-hopper.

Similar characters designate like parts in all the figures of the drawings.

The framework for supporting the operative mechanisms of the weighing-machine is shown similar in a general way to the framework of the weighing-machine described in Letters Patent of the United States No. 548,840 and comprises two side frames or uprights 2 and 4, mounted upon a chambered supporting-base 3 and connected together at their upper ends by the top plate or beam 5, which beam is shown carrying the main supply chute or hopper II, this hopper being shown in the drawings as of larger diameter at the upper than at the lower end thereof, for the purposes hereinafter more fully described.

Mounted upon the base 3 is a V-shaped bearing 6, which constitutes a support for the beam mechanism which carries the load-receiver or bucket, (designated in a general way by G.) This beam mechanism may be of any suitable general construction, and it consists, in the organization thereof shown in the drawings, of a counterweighted scale-beam B, comprising a pair of beam-arms joined at their outer ends by a counterweighted member, and which arm is shown furnished with a pivot or knife-edge 6', supported for oscillatory movement on the V-shaped bearing 6, located on the base 3, as above stated.

The load-receiver will, for convenience, be hereinafter referred to as the "bucket," and it will be understood that the term "bucket" is not to be construed in a limited sense, but applies to a "load-receiver" in the generic meaning of the term.

The bucket G may be carried by the beam mechanism in any usual or suitable manner and is shown furnished at each end thereof with a hanger 555, provided with a V-shaped bearing 7, pivotally supported upon a knife-edge 7', carried at the inner end of the scale-beam B, preferably in alinement with the vertical axis of the bucket.

In the form thereof shown in the drawings the bucket G embodies two relatively narrow end walls 8 and 8', connected at their lower ends by a V-shaped partition 8'', which constitutes the bottom proper of the bucket, the walls of said bucket-bottom diverging from the central vertical line of the bucket toward the front and rear sides thereof, and said bucket also embodies two oppositely-disposed parti-cylindrical bucket-sections L and L', which are pivotally connected together at their adjacent ends and are supported for oscillatory movement upon the end walls 8 and 8' of said bucket. These sections, which constitute oppositely-disposed bucket-closers, each consist of two end plates 9 and 9', connected together at their outer edges by a curved blade 9'', which is preferably concentric to the axis of movement of said section. The lower portions of the inner adjacent edges of the end plates of the bucket-sections are inclined to correspond to the inclinations of the bottom walls of the bucket and are adapted when closed to engage said bottom walls along their outer edges to retain the material in the bucket during the weighing operation.

In contradistinction to the operations of the ordinary gravitative closers of any ordinary weighing-machine of the usual construction the closers L and L' of the bucket of the weighing-machine constituting the subject-matter of my present invention are pivotally supported, as shown at 10, considerably above the bottom or floor-line of the bucket and are adapted to have a vertical movement in the arc of a circle above said floor-line to discharge the contents of the bucket. The pivotal point of the closers L and L' is shown located in vertical alinement with the apex of the bucket-bottom 8'', and said closers, as will be hereinafter more fully described, are organized to have a simultaneous opening movement, which opening movement is contrary to the usual operation positively imparted thereto by connected mechanism.

In weighing-machines of ordinary construction it is customary to support the bucket-closer in such manner that the material within the bucket is supported upon the closer and the weight of said material will effect the opening movement thereof, and said closer is usually supported against opening movement by means of a toggle or equivalent connection, such as described in the patent hereinbefore referred to, and it is one of the chief objects of this invention to provide means for positively imparting a gradual opening movement to the bucket-closer in such manner as to obviate any injurious jarring of the mechanism, which is frequently experienced in weighing-machines in which a sudden opening movement is imparted to the closer by the weight of material resting thereon.

As a means for actuating the bucket-closers L and L', I have provided two coöperative actuators, (designated in a general way by D and D', respectively,) one of which actuators, as D, is in direct connection with and constitutes the primary actuator for the closers L and L'. This actuator D is in the nature of a lever, having a weight 12 at the outer end thereof, and is fixed at its inner end to a rock-shaft 13, which is journaled in the end walls 8 and 8' of the bucket G. The other actuator as D', which may consistently be termed the "auxiliary" actuator, is in the nature of a counterweighted arm pivotally supported remote from the inner end thereof upon the scale-beam B and having its extreme inner end in position to engage the under side of the actuator D to lift the same and effect a closing movement of the closers L and L' at the proper time in the weighing operation, as will be hereinafter more fully described.

Thus it will be seen that the actuator D practically constitutes a closer-opening actuator, and the actuator D' constitutes a closer-shutting actuator, although the shutting movement of the closers is directly imparted by the actuator D upon a movement of the actuator D'.

In the form thereof shown in the drawings the connection between the closer-opening actuator D and the closers L and L' comprises, in connection with the rock-shaft 13, two crank-arms 15 and 15', fixed to opposite ends of the rock-shaft 13 in juxtaposition to opposite end walls of the bucket, and two pairs of links pivotally connecting the inner end of the crank-arms 15 and 15' to the two bucket-closers, one pair being located at each end of said bucket, as will be understood by reference to Fig. 1 of the drawings. Each pair of connecting-links for the bucket-closers comprises two links 16 and 16', which are obliquely disposed and are pivotally connected together at their upper ends and are pivotally connected at this end to the inner end of the crank-arm, which is fixed at its outer end to the rock-shaft 13, and the link 16 is pivotally connected at its lower end to the closer L at one side of and preferably below the pivotal point of said closer, and the other link is similarly pivotally connected at its lower end to the opposite closer L'.

The mechanism for controlling the operations of the bucket-closer actuators will be hereinafter fully described.

The weighing mechanism embodies the usual poising and counterpoising mechanisms. All that part of the beam mechanism located at the right-hand side of the beam-support, as shown in Fig. 2, constitutes the counterpoising mechanism, and all that part of the beam mechanism located at the left of said beam-support, including the bucket mechanism, which is supported thereby for ascending and descending movements, constitutes the poising mechanism.

As a means for controlling the supply of material to the bucket G as it flows through the main supply chute or hopper H, I have provided a supplemental supply-chute H' and a stream-controller or valve 70 in operative relation with said supplemental chute. The valve or stream-controller 70, which for the purposes of my present invention may be considered of substantially the same general construction as the valve described in the patent hereinbefore referred to, is shown pivotally supported between the two side frames 2 and 4 for oscillatory movement in a plane intersecting the vertical axis of the supplemental chute H', said valve being shown furnished with outwardly-projecting pivot-arms 17 and 17', which are pivotally supported at their outer ends in bearings on the side frames 2 and 4, and said valve is also furnished near the inner ends of said arms 17 and 17', with two inwardly-projecting trunnions 18 and 18', the axes of which are in parallelism with the common axis of the two arms 17 and 17', but are located slightly at one side of said axis, and the supplemental chute H' is pivotally supported at a point intermediate the upper and lower ends thereof and substantially midway of its width upon the trunnions 18 and 18' for a limited amount of vertical movement simultaneously with and in a plane intersecting the path of movement of the cut-off blade of the valve. The supplemental chute H' is pivotally connected with the valve 70 in such manner as to normally exert a downward thrust upon the valve at one side of its axis of movement, and thereby tend to effect a closing movement of said valve, this organization furnishing means for accelerating the closing movement of the valve and compensating for retarding resistances exerted by connected mechanisms, this chute being preferably of conical form, with the enlarged end uppermost, so that the weight of the material in the hopper will multiply the force of the valve-closing action of said hopper. Furthermore, it will be seen that by pivotally supporting the chute H' upon the valve slightly at one side the axis of movement of said valve the distance between the cut-off blade and the discharge end of the hopper is gradually decreased during the closing movement of the valve, so that when the valve is fully closed the cut-off blade is brought in close proximity to the discharge end of the chute, which necessarily reduces the amount and the effective weight of the material carried upon the cut-off blade and facilitates an opening movement of the valve with the minimum amount of power, for the reason that during such opening movement the cut-off blade and discharge end of the hopper are gradually separated, thus lessening the valve-retarding resistance of the material between the valve-blade and hopper, which might otherwise accrue from the close packing of the material at this point.

As a means for imparting a closing movement to the valve I have provided, in connection with said valve, a valve-actuator which in the preferred form thereof (shown most clearly in Figs. 3, 6, and 9 of the drawings) comprises two coöperative valve-actuator members, (designated in a general way by $e$ and $e'$, respectively,) one of which members, as $e$, is shown as a cam-arm fixed to the pivot-arm 17' of the valve to have an oscillatory movement in the direction of and with said valve, and which actuator member $e$ has a force-modifying cam-face 19, and the other of which actuator members, as $e'$, is shown as a flexible weight-carrier, pivotally secured at 20 to the upper end of the actuator member or arm *e* in position to rest upon and roll in contact with the cam-face 19 of said member during the opening and closing movement of the valve. In practice the actuator member *e'* may consist of a chain or strap of a length in excess of the length of the cam-face of the member *e* and a weight fixed to the lower end thereof and depending below the lower end of the member *e'*.

The actuator member *e* is shown so disposed relatively to the valve 70 that when the valve is in its extreme open position the upper end of said member terminates above and slightly at one side of the axis of movement of the valve, the upper end of the arm and the upper end of the cut-off blade of the valve being located, when the valve is in the position shown in Figs. 2 and 3, at opposite sides, respectively, of the axis of movement of said valve, and the lower portion of the cam-face of said arm being located between said cut-off blade and said axis.

For the purpose of securing the necessary reduction in the velocity of the valve during the first stages of the closing movement thereof and continuing such reduction until the valve has arrived at its drip position, as shown in Fig. 5, and for securing the necessary increase in velocity during the last stages of the closing movement of said valve to effect a quick closing movement thereof after the same has passed the drip position, the working face of the actuator member *e* is preferably made straight for a portion of its length, beginning at the upper end thereof, as shown at 20', which straight portion merges into a cam-face 20", which is eccentric to the axis of movement of said arm, and the successive portions of this cam-face are of greatly-increased distances from said axis from the upper toward the lower end of said face.

Thus it will be seen that during the first stages of the closing movement of the valve 70, or as said valve is shifted from the position shown in Fig. 2 to that shown in Fig. 5, the upper and lower ends of the valve-actuator member *e* move in opposite directions toward an imaginary center line drawn vertically through the axis of movement of the valve, and in consequence thereof the lower end of the counterweighted member *e'* during this operation of the closing movement of the valve has a very short range of movement.

It will furthermore be seen that the valve-closing force exerted by the counterweighted actuator member *e'* is on account of the gradual approach of the lower end of said member toward the axis of the valve and during this portion of the valve-closing movement gradually decreased until the valve arrives at the drip position. (Shown in Fig. 5.) After the valve arrives at the drip position, at which time the counterweighted actuator member *e'* has its longitudinal axis in a substantially vertical plane and consequently exerts the least valve-closing force, said actuator member *e'* is on the continued advancing movement of the upper end of the member *e* beyond the imaginary line quickly shifted outward and away from the axis of the valve to a point considerably beyond that at which it was located when the valve was in its drip position, thus securing a gradually-increasing leverage and materially accelerating the closing movement of the valve after the same passes the drip position.

For effecting an opening movement of the valve 70 said valve is shown carrying at one side of the path thereof a depending thrust-rod 558, which is pivotally connected at its upper end to said valve and is preferably bifurcated at its lower end, which bifurcated end straddles a pin or projection on the inner end of a counterweighted shiftable lever 551, pivoted to the scale-beam B, and which normally forms a part of the counterpoising mechanism, but which is shiftable on the poising mechanism at a predetermined point in the operation of the machine. On the return movement of the shiftable lever to its normal position the effective end 551" thereof is effective for imparting an upward thrust to the connecting thrust-rod 558 for effecting the opening of the valve 70.

For maintaining the shiftable lever 551 in its normal position a stop 552 is preferably provided on the outer end of the lever which engages the scale-beam B, as will be understood by reference to Figs. 1, 3, and 10 of the drawings.

The means for effecting the opening movement of the valve 70 is shown similar, in a general way, to the valve-opening means described in the patent hereinbefore referred to, to which reference may be had for a more complete description of this operation.

On the descent of the bucket with the beam mechanism during the completion of the load the counterweighted lever 551 will be carried down with the beam mechanism until the latter has reached the limit of its downstroke, at which time the bucket-closers are open for discharging the bucket-load. During the discharge of a load the valve 70 will be held against an opening movement by interlocking devices hereinafter described. Although the beam mechanism is free to return to the normal position thereof, (shown in Fig. 2,) the lever 551 will, however, be locked against movement with the beam B, for the reason that the rod 558, which bears at its lower end against said lever and which is pivoted to the valve 70, cannot have an ascending movement until the release of said valve. When the valve is released, which is effected simultaneously with the shutting of the bucker-closer, as will be hereinafter described, the lever 551 will also be released and can then resume its normal position, as shown in Fig. 2, and in so doing it will transmit an upward thrust to the rod 558 to open the valve, as before described.

The actuator D', which lifts the actuator D and thereby controls the closing movement of the closers L and L', has a movement during the descent of the bucket in parallelism with the beam B, and when the same has arrived in the position thereof shown in Figs. 10 and 11, where it bears at its inner end against the inside of the actuator D, is locked against a closer-shutting movement by coöperating interlocking devices in operative relation with the closer-opening actuator D, as will be hereinafter described, which interlocking devices are effective for retaining the actuator D' against effective movement until a predetermined time subsequent to the complete discharge of the load from the bucket G.

As a convenient means for locking the closers in their closed positions until the valve 70 is in the very last stage of its closing movement I have provided latch mechanism in operative relation with the valve-opening thrust-rod and the closer-actuator D, which in the preferred form thereof (shown most clearly in Fig. 4 of the drawings) comprises a latch (designated in a general way by $l$) which is pivotally carried on the bucket G and a latch-engaging member, which is shown as an arm 22, fixed to the rock-shaft 13, to which the closer-opening actuator D is secured. The latch $l$ embodies a series of radiating arms, (herein shown as four in number and designated by 23, 24, 25, and 26, respectively.) The arm 23 of the latch member is shown projecting normally in a horizontal plane and has its outer end located in the path of movement of a latch-tripper 23', carried on the thrust-rod 558, which effects the opening movement of the valve 70. The arm 24 of said latch member is shown projecting downward from the hub or central portion of said member and has at the extreme outer end thereof a catch or abutment 24', located in position to normally engage the outer free end of the arm 22, carried on the closer-actuator rock-shaft. The arm 25 of said latch member extends outward horizontally from the middle portion of said latch and is furnished at the outer end thereof with a weight 25' for normally retaining the arm 24 in position to engage the free end of the actuator-locking arm 22, and the arm 26 of said latch member extends upward and is furnished at the free end thereof with a pivotally-supported and counterweighted by-pass 26', the free end of which coöperates with a stop-face 27' of a stop member 27, fixed to one of the pivot-arms of the valve and prevents the accidental tripping of the latch and the consequent closer-opening movement of the actuator D when the valve 70 is in the open position. (Shown in Fig. 2 of the drawings.)

The latch-tripper 23' is located upon the thrust-rod 558 in such position as to engage and trip the latch $l$ immediately after the valve 70 has fully cut off the supply of material to the bucket from the chute H', and the stop-face 27' of the stop 27 is of such length and so disposed as to coöperate with the by-pass 26', which by-pass also constitutes a coöperative stop member, and prevent the accidental tripping of the latch until the valve has passed the drip position. (Shown in Fig. 5.)

The stop member 27 is secured to the pivot-arm of the valve in such manner as to be lifted above the by-pass 26 during the last stages of the closing movement of the valve, so as to permit the latch $l$ to be tripped by the latch-tripper 23'. The stop on the by-pass prevents vertical movement on the inner end of said by-pass, but allows the same to be depressed as the stop member 27 descends during the opening movement of the valve, said by-pass being furnished with a counterweight for normally holding the same in position. (Shown in Fig. 2.)

From the foregoing it will be seen that the bucket-closers are not only locked against premature movement by means of the latch $l$, but the latch $l$ is also locked against accidental movement, rendering the locking of the closer doubly effective.

As a means for temporarily interrupting the closing movement of the valve 70 and preventing the tripping of the latch $l$ for opening the closer until the bucket has received the correct load I have provided a by-pass 30, which is shown pivotally supported upon the inner end of the scale-beam B and is held against movement in the direction of closing movement of the valve, and have provided the valve with a stop-arm 31, which projects beyond the peripheral line of the cut-off blade and has its free end in position to engage the by-pass when the valve has reached a predetermined point in its closing movement, whereby said valve is held as against further closing movement until the by-pass has descended with the bucket and beam mechanism to a point below the path of movement of said arm 31, after which the valve-actuator, in connection with the additional weight of the chute H' and contents, completes the closing movement of the valve with extreme rapidity.

As a convenient means for locking the valve as against closing movement when the bucket-closers are in their open positions and for locking the bucket-closers against opening movement when the valve is in its open position I have provided a series of interlocking devices which are reciprocally effective, and a regulator-hopper, which is designated in a general way by $H^2$ and which is located below the bucket, for controlling the effective operations of these interlocking devices.

The regulator-hopper, in the preferred form thereof shown most clearly in Figs. 2 and 3 of the drawings, comprises two oppositely-disposed semiconical sections 33 and 34, respectively, which are pivotally supported near their outer edges at 33' and 34', respectively, to the base 3 of the machine and have angularly-disposed projections 35 and 36, respectively, at their adjacent lower edges.

These two hopper-sections are pivotally connected together to have an opening and closing movement in unison by means preferably of a connecting rod or strap 37, pivoted at one end to one section below the pivotal point of said section and pivoted at the opposite end to the other section at a point above the pivotal point of said section, and one of said sections is provided with a weighted arm 39, which extends outward beyond the pivotal point of said section and is adapted for normally maintaining the two sections in their relatively-closed positions. The coöperative stop devices for holding the valve 70 against an opening movement when the bucket-closers are in their open positions comprises a rocker or stop member 40, carried on one of the pivot-arms of the valve, preferably at the side of the axis opposite to the side upon which the valve-blade is located, and the coöperative stop member 41 is pivotally carried on the frame and has a crank-arm 42, which is connected by means of a connecting-rod or stop-member-actuating rod 43 to one of the sections of the regulator-hopper, as shown most clearly in Figs. 1 and 3 of the drawings, said stop member 41 being so disposed relatively to the stop member 40, carried by the valve, that when the sections of the regulator-hopper are in their open positions and the valve 70 is in its closed position the stop member 40 on the valve will engage the upper stop-face of the stop member 41 and will be held as against opening movement until said stop member 41 is shifted to the position shown in Fig. 3 by the closing movement of said section, which will leave the stop member 40 free to descend by the opening movement of the valve.

The locking device for preventing the closing movements of the closers when the valve is in its open position comprises a suitable arm 44, carried on the rock-shaft 13 of the closer-actuator, and the stop member 45, carried on the shaft 41', which supports the stop member 41, and said stop members are so located relatively to each other that when the closer-actuator D is in its depressed position, as shown most clearly in Fig. 11 of the drawings, the forward free end of the stop-arm 44 will engage the stop-face of the stop member 45 and will prevent an opening or ascending movement of said actuator until the closer-section connected with the stop members 41 and 45 is in its fully-closed position. (Shown in Figs. 2 and 3.)

From the foregoing it will be seen that the valve 70 cannot have an opening movement, neither can the bucket-closers have a closing movement, until all of the material contained in the bucket has been discharged and until it has passed through the regulator-hopper and the sections of the regulator-hopper have returned to their normally-closed positions.

The operation of the machine will be readily understood by any one skilled in the art to which this invention appertains.

Having described my invention, I claim—

1. The combination, with weighing mechanism embodying a load-receiver and a main supply-chute, of a valve; and a supplemental chute operable with said valve in such manner as to exert, by its own weight and the weight of its contents, a closing force on said valve.

2. The combination, with weighing mechanism embodying a load-receiver and with a fixed main supply-chute, of a supplemental chute supported for reciprocatory movements bodily between the load-receiver and supply-chute; a reciprocatory valve supported on the framework, between the load-receiver and supplemental chute, and having means for supporting said supplemental chute; and actuating means for effecting simultaneous movements of the valve and supplemental chute in relatively transverse planes.

3. The combination, with weighing mechanism embodying a load-receiver and with a fixed main supply-chute, of an oscillatory valve pivotally supported on the framework, between the load-receiver and the main supply-chute; a supplemental chute supported upon and at one side the axis of the movement of the valve, for vertical reciprocatory movements; and means for effecting simultaneous movements of the valve and supplemental chute in relatively-intersecting planes.

4. The combination, with framework and with a fixed main supply-chute supported thereon, of a valve pivotally supported on the framework and having chute-supporting trunnions whose axes are located slightly at one side the axes of movement of said valve; and a supplemental chute mounted on said trunnions, whereby the weight of said supplemental chute and its contents tends to effect a closing movement of the valve.

5. The combination, with weighing mechanism, a load-receiver, and with a main supply-chute, of a supplemental chute shiftably supported between the load-receiver and main supply-chute, to have a movement toward and away from the load-receiver; and a stream-controller supported for reciprocatory movement and between the load-receiver and supplemental chute and effective upon its opening and closing movements for advancing and retracting said supplemental chute relatively to the load-receiver.

6. The combination, with weighing mechanism including a load-receiver and with a fixed main supply-chute, of an oscillatory stream-controller; a supplemental chute supported for oscillatory movement upon, and at one side the axis of, the stream-controller; and a gravitative actuator carried by said stream-controller.

7. The combination, with weighing mechanism including a reciprocatory load-receiver and with a fixed supply-chute, of an oscillatory stream-controller located between the load-receiver and supply-chute and having its axis horizontally disposed; a supplemental chute pivotally supported on, and remote from the axis of movement of, said controller and adapted to have a movement in a vertical direction toward and away from said controller; means carried by the main supply-chute, for guiding the supplemental chute in its vertical movement; means controlled by the weighing mechanism, for imparting an opening movement to the stream-controller; means for locking the stream-controller in its open position; and means carried by the stream-controller and adapted for effecting a closing movement thereof and for simultaneously effecting a vertical movement of the supplemental chute.

8. The combination, with weighing mechanism including a load-receiver and with a main supply-chute, of a stream-controller supported for oscillatory movement; a supplemental chute having a pivotal support that is so located on the stream-controller as to have a movement in the arc of a circle about and with the axis of said controller; means controlled by the weighing mechanism, for raising the supplemental chute and opening the stream-controller simultaneously; and a gravitative actuator carried by and effective for closing the stream-controller.

9. The combination, with weighing mechanism embodying a shiftable load-receiver and with a supply-chute, of a stream-controller located between the load-receiver and supply-chute and having a fixed horizontal axis of movement; a supplemental chute pivotally supported on the stream-controller and having its support shiftable about its axis of movement of the stream-controller; and means controlled by the weighing mechanism, for effecting a simultaneous movement of the stream-controller and supplemental chute in relatively transverse planes.

10. The combination, with framework, of an oscillatory valve having a fixed horizontal axis; a gravitative chute pivotally supported substantially midway of its height on the valve, remote from the axis of movement of said valve; and a valve-closing actuator comprehending means for effecting relatively transverse movements of the valve and chute simultaneously.

11. The combination, with weighing mechanism embodying a shiftable load-receiver and a fixed supply-chute, of an oscillatory valve having a fixed axis; a gravitative supplemental chute supported by the valve below the main supply-chute; and actuating means in connection with the valve and adapted for imparting transverse movements simultaneously to the valve and supplemental chute.

12. The combination, with weighing mechanism including a reciprocatory load-receiver and with a fixed main supply-chute, of an oscillatory stream-controller; a supplemental chute operable with said stream-controller in such manner as to exert, by its own weight and the weight of its contents, a closing force on said valve; a closer pivotally supported to have oscillatory movements in a vertical direction above the bottom edge of the receiver; a closer-opening actuator in operative connection with said closer; and means actuated by the stream-controller, on the closing movement thereof, for effecting a closer-opening movement of the closer-actuator.

13. In a weighing-machine, the combination, with a suitable frame and with beam mechanism pivotally supported on said frame, of a main supply-chute; a valve supported on the frame, for oscillatory movement, below said supply-chute; a supplemental chute pivotally supported on the valve, remote from the axis thereof and in such manner as to exert, by its own weight and the weight of its contents, a closing force on said valve; means in connection with the beam mechanism, for imparting an opening movement to the valve and a rising movement to the supplemental chute, simultaneously; a load-receiver supported on the beam mechanism and open at one side thereof; a closer pivotally supported on the load-receiver to have oscillatory movements in a vertical direction above the bottom edge of said receiver; a closer-opening actuator; and means controlled by the valve, on the closing movement thereof, for effecting a closer-opening movement of said actuator.

14. In a weighing-machine, the combination, with framework and with beam mechanism fulcrumed on said framework, of a main supply-chute; an oscillatory stream-controller pivotally supported on the framework below said supply-chute; a supplemental chute pivotally supported on the stream-controller at one side the axis thereof and between said controller and main supply-chute, whereby the weight of said supplemental chute and its contents will assist the closing movement of the controller; a controller-closing actuator adapted for imparting a variable movement to said closer; a controller-opening actuator in operative connection with the beam mechanism and effective for imparting relatively transverse opening movements to the controller and supplemental chute, simultaneously; a load-receiver mounted on the beam mechanism; two oppositely-disposed concentrically-shiftable closers pivotally supported on the load-receiver; a closer-opening actuator having a linkage connection with the two closers and effective for simultaneously opening both closers; and means controlled by the controller, on the closing movement thereof, for effecting a closer-opening movement of the closer-actuator.

15. The combination, with beam mechanism and supporting means therefor and with a load-receiver supported on said beam mechanism, of two stream-controlling members, one of which is in the nature of a gravitative member and is pivotally connected to the other member in such manner that the weight thereof will effect a relatively transverse movement of the other member; means connecting the two stream-controlling members and beam mechanism and adapted for imparting relatively transverse movements to the stream-controlling members during a movement of the beam mechanism in one direction; a closer pivotally supported on the load-receiver; a closer-opening actuator having a linkage connection with said closer; and means controlled by one of the stream-controlling members, on the gravitation thereof, for effecting a closer-opening movement of the closer-actuator.

16. The combination, with weighing mechanism including scale-beams and a load-receiver supported thereon and with a supply-chute located above the receiver, of an oscillatory valve having a fixed horizontal axis of movement; a supplemental chute pivotally supported on the valve at one side the axis of movement thereof in such manner as to exert, by its own weight and the weight of its contents, a closing force on said valve; an oscillatory closer pivotally supported on the load-receiver; a gravitative closer-opening actuator fulcrumed on the framework and having at the poising end thereof a linkage connection with the closer; a valve-opening actuator connecting the valve and beam mechanism; a locking device for normally retaining the closer-opening actuator with its counterweighted end in an elevated position; and means controlled by the valve, on the closing movement thereof, for releasing the locking device to effect a closer-opening movement of the closer-actuator.

17. The combination, with beam mechanism and with a load-receiver supported thereon, of a valve having a fixed horizontal axis of movement; a supply-chute pivotally supported on said valve at one side the axis of movement thereof in such manner as to exert, by its own weight and the weight of its contents, a closing force on said valve; a valve-opening actuator operatively connecting the valve and beam mechanism; a gravitative valve-closing actuator carried by the valve and effective for imparting to said valve a closing movement of varying velocities; two concentrically-movable closers pivotally connected to the load-receiver, with their axes coincident, and adapted to have an oscillatory movement above the floor-line of said receiver; a counterweighted closer-opening actuator fulcrumed intermediate its ends; links connecting the inner non-counterweighted end of said actuator with the two closers, respectively; a gravitative latch normally engaging and locking the closer-opening actuator, with its counterweighted end in an elevated position; a stop carried by the valve and effective, when the valve is in its open position, for blocking the latch against an actuator-releasing movement; and means controlled by the valve, on the last stage of the closing movement thereof, for releasing the latch from engagement with the closer-actuator, to thereby effect a closer-opening movement of said actuator.

18. The combination, with supply apparatus embodying a valve and a valve-actuator, of weighing mechanism embodying a reciprocatory bucket having an inclined bottom wall and having a discharge-opening at one side of, and above, said bottom wall; a particylindrical closer pivoted to said bucket at a point substantially intersecting the longitudinal axis of, and adapted for normally closing, the discharge-opening of the bucket; a closer-opening actuator pivotally connected to said closer and effective, on the closing movement of the valve, for directly imparting an upward opening movement to the closer; a shiftable regulator-hopper; and means controlled by the regulator-hopper, for imparting a closing movement to the closer.

19. In a weighing-machine the combination, with supply apparatus having a valve and with weighing mechanism embodying a reciprocatory bucket having a closer, of two independent gravitative actuators; a regulator-hopper located below the bucket; means controlled by the valve, on the closing movement thereof, for effecting a closer-opening movement of one actuator; and means in connection with the regulator-hopper, for controlling the effective movement of the other actuator.

20. In a weighing-machine the combination, with a regulable supply apparatus and with weighing mechanism embodying a bucket having a bucket-closer, of a regulator-hopper supported below the bucket; and two reciprocally-effective bucket-closer actuators, one of which is controlled by the bucket, on the descent thereof, for opening the closer, and the other of which is controlled by the hopper and is effective, on a movement thereof, for shutting the bucket-closer; and locking devices for reciprocally locking the two actuators in their ineffective positions.

21. In a weighing-machine, the combination, with a supply apparatus and with weighing mechanism embodying a bucket-closer, of a valve in operative relation with the supply apparatus; a counterweighted closer-opening actuator in operative connection with the bucket-closer; and means controlled by the valve, on the closing movement thereof, for effecting a closer-opening movement of said actuator.

22. In a weighing-machine, the combination, with a supply apparatus and with an oscillatory stream-controlling valve in connection with said supply apparatus, of a shiftably-supported bucket having a closer; a mechanically-operated closer-opening actuator in connection with said closer; and means controlled by the valve, on the closing movement thereof, for effecting a closer-opening movement of said actuator.

23. In a weighing-machine, the combination, with a supply-chute and with a stream-controlling valve in operative relation with said chute, of a load-receiver supported for ascending and descending movements; a closer carried by said load-receiver; a valve-actuator in connection with said valve; and a counterweighted closer-opener controlled by the valve, on the closing movement thereof, for positively imparting an opening movement to the closer.

24. In a weighing-machine, the combination, with a supply-chute having a valve and with weighing mechanism embodying a vertically-reciprocatory load-receiver having a closer in pivotal connection therewith, of a valve-closing actuator in operative connection with the valve; a valve-opening actuator in connection with the weighing mechanism and valve; a closer-actuator having links in operative connection with the closer; and means controlled by the valve-closing actuator, on the closing movement of the valve, for effecting a closer-opening movement to the closer-actuator.

25. In a weighing-machine the combination, with a supply-chute having a valve and with weighing mechanism embodying a vertically-reciprocatory bucket having a bucket-closer in pivotal connection therewith; of a valve-closing actuator in operative connection with the valve; valve-opening-actuating means in connection with the weighing mechanism and valve; a bucket-closing actuator in operative connection with the bucket-closer; means controlled by the valve-closing actuator, on the valve-closing movement thereof, for effecting a closer-opening movement of the closer-actuator; a regulator-hopper supported below said bucket; and means controlled by said hopper, for imparting a closer-shutting movement to the closer-actuator.

26. In a weighing-machine the combination, with a supply-chute and with a stream-controlling valve and actuating mechanism therefor, of weighing mechanism embodying a bucket having a bucket-closer; a regulator-hopper shiftably supported below said bucket; a bucket-closer actuator in operative connection with the bucket-closer; means controlled by the valve, on the closing movement thereof, for effecting a closer-opening movement of said actuator; and means controlled by the opening movement of the regulator-hopper, for imparting a closer-shutting movement to said actuator.

27. In a weighing-machine, the combination, with weighing mechanism embodying a shiftably-supported bucket having a closer, of a chute located above the bucket; a valve in operative connection with said chute; means for imparting a closing and opening movement to said valve; a pivotally-supported gravitative bucket-closer actuator in operative connection with the bucket-closer; a regulator-hopper supported below the bucket; means controlled by said hopper, for imparting a closer-shutting movement to the closer-actuator just preceding the opening movement of the valve; and means intermediate the closer-actuator and valve, for normally locking said closer-actuator in a position to retain the closer shut, and which means is effective, on the closing movement of the valve, for releasing said actuator to facilitate a closer-opening movement thereof.

28. In a weighing-machine the combination, of weighing mechanism embodying a bucket supported for vertical movement and having an oscillatory closer; a chute shiftably supported above said bucket, for vertical movement; a valve supported for movement in a plane intersecting the plane of movement of the chute; a regulator-hopper supported below the bucket and embodying one or more openable and closable sections; coöperative actuating and interlocking devices primarily controlled by the weighing mechanism and effective, on certain movements of said mechanism, for closing the valve, opening the bucket-closer, and opening the regulator-hopper successively and in the order named and for locking said valve, closer, and hopper intermediate such successive operations.

29. In a weighing-machine the combination, with weighing mechanism embodying a shiftably-supported bucket having a bucket-closer, of an openable and closable regulator-hopper supported below said bucket; a bucket-closer actuator in operative connection with the bucket-closer and having a stop member; means for effecting an opening and closing movement of said closer-actuator; and a stop device controlled by the hopper and coöperating with the stop member of the closer-actuator, for locking said actuator against a closer-shutting movement while the hoppper is in its open position.

30. In a weighing-machine the combination, with weighing mechanism embodying a bucket having a closer, of a closer-actuator; a normally-closed regulator-hopper located below the bucket and adapted to have an opening movement; and stop devices controlled by the hopper, on the opening movement thereof, for locking the closer-actuator in a position for preventing the shutting movement of the closer.

31. In a weighing-machine the combination, with weighing mechanism embodying a bucket having a closer and with a counterweighted lever for imparting an opening movement to the closer, of a regulator-hopper comprising two pivotally-supported openable and closable sections coöperatively connected together; a counterweighted lever in connection with one of said sections and effective for normally retaining said sections in a closed position; and interlocking devices controlled by said sections and coöperating with the closer-actuating lever, to prevent a closer-shutting movement of said lever while the hopper-sections are in their open positions.

32. In a weighing-machine the combination, with a scale-beam, of a bucket supported on said beam and having a V-shaped bottom, the apex of which is located near the central portion of the bucket; two oppositely-disposed oscillatory bucket-closers pivotally connected together at a point substantially in vertical alinement with the apex of the beam of the bucket; two oppositely-disposed weighted actuators, one actuator of which has a linkage connection with the two bucket-closers and is effective on the descending movement thereof for imparting an opening movement to the closers, and the other actuator of which is effective on the descending movement thereof for imparting a closer-shutting movement to the first-mentioned actuator; and means for controlling the movements of the two actuators.

33. In a weighing-machine the combination, of a valve-regulated vertically-shiftable chute; weighing mechanism embodying a vertical reciprocatory bucket located below said chute and embodying two oppositely-disposed oscillatory closers; means controlled by the chute, on the descending movement thereof, for imparting an opening movement to the closers; an openable and closable regulator-hopper located below the bucket; interlocking devices controlled by the hopper, for locking the closers in their open positions until the hopper is closed; means for automatically closing the hopper; and means for effecting a closing movement of the closers immediately succeeding the closing movement of the regulator-hopper.

34. In a weighing-machine the combination, with weighing mechanism embodying a reciprocatory bucket having a bucket-closer and with a chute having a stream-controlling valve coöperatively connected therewith, of a regulator-hopper located below the bucket and organized to have an opening movement; and coöperative stop devices controlled by the regulator-hopper, for locking the stream-controlling valve in its closed position and for simultaneously locking the bucket-closer in its open position.

35. In a weighing-machine the combination, with a bucket having a closer, of a closer-actuating mechanism for imparting opening and closing movements to said closer; an openable and closable regulator-hopper located below the bucket; and interlocking devices in operative relation with the closer-actuating mechanism and the hopper and effective for locking the hopper in its closed position when the bucket-closer is closed and for locking the bucket-closer in its open position when the hopper is open.

36. In a weighing-machine the combination, with weighing mechanism embodying a bucket having a closer and with a supply-chute and an oscillatory valve in connection with said chute, of a bucket-closer actuator controlled by the valve, on the closing movement thereof, for directly imparting an opening movement to the closer; an openable and closable regulator-hopper located below the bucket; coöperative stop devices in operative relation with the valve, closer-actuator, and hopper and effective, on the opening movement of the hopper, for simultaneously locking the valve in its closed position and the closer in its open position; and means controlled by the hopper, for imparting a closer-opening movement to the closer-actuator.

37. In a weighing-machine the combination, with a suitable framework and with beam mechanism; of a bucket supported on the beam mechanism, for ascending and descending movements and having two oppositely-disposed bucket-closers pivotally supported for movement about a common axis; and a counterweighted closer-actuator located above the bucket-closer; and two links pivotally connected one to each closer at opposite sides, respectively, of the axis of movement, and pivotally connected with the closer-opening actuator substantially in vertical alinement with the axis of movement of, the closers, whereby the counterweighted actuators, on the descending movement, will impart an opening movement simultaneously to the two closers.

38. In a weighing-machine the combination, with weighing mechanism including a bucket having two oppositely-disposed bucket-closers; of actuating mechanism for said closers, comprising two gravitative levers, one of which has a linkage connection with, and is self-active for imparting an opening movement simultaneously to, the two closers, and the other of which has one end thereof in position for engaging the first-mentioned lever and is effective, upon the descending movement thereof, for imparting a closer-shutting movement to said lever.

39. In a weighing-machine the combination, with beam mechanism; of a bucket supported for vertical reciprocation on said beam mechanism and comprising two oppositely-disposed, pivotally-connected closer-sections, a support for said sections, and an inverted-V-shaped bottom interposed between the lower adjacent portions of the two closer-sections; a stream-supply chute; a stream-controller in pivotal connection with said chute; a closer-section actuator effective, on the closing movement of the controller, for swinging the sections on their common axis upward and away from the V-shaped bottom; and means intermediate the valve and closer-section actuator and effective for normally locking said actuator in its closer-shutting position.

40. In a weighing-machine the combination, with beam mechanism; of a bucket supported for vertical reciprocation on said beam mechanism and comprising two oppositely-disposed, pivotally-connected closer-sections and an inverted support for said sections and an inverted-V-shaped bottom interposed between the lower adjacent portions of the two closer-sections; a stream-supply chute; a stream-controller in pivotal connection with said chute; a closer-section actuator effective on the closing movement of the controller, for swinging the sections on their common axis upwardly and away from the V-shaped bottom; a latch effective, on the opening movement of the stream-controller, for engaging and locking the closer-section actuator in the position it occupies when the closer-sections are shut; and means controlled by the closing movement of the stream-controller, for tripping the latch to permit a section-opening movement of said actuator.

41. In a weighing-machine the combination, with weighing mechanism embodying a reciprocatory bucket having a closer and with a supply-chute having a stream-controller; of a gravitative closer-opening actuator in operative connection with, and effective for positively imparting an opening movement to, the bucket-closer; a latch in normal engagement with the closer-actuator and locking the same in position to retain the closer shut; a latch-tripper controlled by the stream-controller, on the closing movement thereof, for tripping the latch and to thereby release and effect a closer-opening movement of, the actuator; and a stop carried by the stream-controller and coöperating with the latch, to normally lock said latch against an actuator-releasing movement until the stream-controller is in its closed position.

42. In a weighing-machine the combination, with weighing mechanism embodying a reciprocatory bucket having a closer and with a supply-chute having a stream-controller; of a gravitative, closer-opening actuator in operative connection with, and effective for positively imparting an opening movement to, the bucket-closer; a latch in normal engagement with the closer-actuator and locking the same into position to retain the closer shut; a latch-tripper controlled by the stream-controller, on the closing movement thereof, for tripping the latch and to thereby release and effect a closer-opening movement of, the actuator; a stop carried by the stream-controller and coöperating with the latch, to normally lock said latch against an actuator-releasing movement until the stream-controller is in its closed position; an openable and closable regulator-hopper located below the bucket; and means controlled by, and effective on the opening movement of, said hopper, for locking the stream-controller in its closed position and the closer-actuator in its closer-opening position.

43. The combination, with weighing mechanism embodying a bucket, of a supply-chute supported above said bucket; an oscillatory valve having a fixed axis of movement; a valve-closing actuator located at one side of the axis of said valve; a supplemental chute supported on the valve in such manner as to exert a closing force thereon; a stop member located on the valve at the opposite side of the valve-axis; a shiftably-supported regulator-hopper located below the bucket; and a stop member controlled by the hopper and coöperating with the stop member on the valve, for locking said valve in its closed position.

44. In a weighing-machine the combination, with weighing mechanism embodying a bucket having a closer, of a supply-chute having an oscillatory valve; a shiftable valve-actuator located at one side of the axis of, and carried by, the valve and embodying means for effecting a change in the velocity of the valve at different points in the length of the movement thereof; a stop member located at the opposite side of the valve-axis; an openable and closable regulator-hopper located below the bucket; and a stop member actuated by said hopper, on the closing movement thereof, and coöperating with the stop member of the valve, to lock said valve in its closed position.

45. In a weighing-machine the combination, with a suitable framework and with weighing mechanism embodying a bucket, of a valve pivotally supported on the framework; a valve-actuator carried by the valve and embodying means for imparting to said valve a closing movement of differential velocities; and a supply-chute wholly supported on the valve in such a manner that the weight of said chute and its contents tend normally to accelerate the closing movement of the valve.

46. In a weighing-machine the combination, with a framework and with weighing mechanism including a bucket, of an oscillatory stream-controller having inwardly-projecting trunnions in eccentric disposition relatively to the axis of movement of said valve; a supply-chute supported on said trunnions; and guiding means for said chute.

47. In a weighing-machine a pivotally-supported stream-controller having chute-supporting trunnions whose axes are located slightly at one side the axis of movement of said controller; a supply-chute supported on said trunnions, for vertical movement with, and transversely the path of movement of, the stream-controller; and actuating means for said controller.

48. In a weighing-machine the combination, with a pivotally-supported stream-controller; of a substantially conical chute supported on said stream-controller, for vertical movement simultaneously with, and in a plane intersecting the plane of movement of, the controller; and means for actuating the controller.

49. In a weighing-machine the combination, with a main supply-chute and with an oscillatory stream-controller pivotally supported below said main supply-chute and having a cut-off blade; of a substantially conical supplemental chute pivotally supported on the stream-controller, with the axis of said support slightly at one side the axis of movement of said controller, and having its enlarged receiving end surrounding the discharge end of the main supply-chute and having its smaller discharge end located below the pivotal support thereof and in juxtaposition to the path of movement of the cut-off blade of the stream-controller; means for actuating the stream-controller, to thereby impart, simultaneously, vertical reciprocations to the supplemental chute; and means for guiding the supplemental chute during its movements.

50. In a weighing-machine the combination, with a main supply-chute and with a stream-controller pivotally supported in the plane of longitudinal axis of said chute and having a curved cut-off blade, of a supplemental supply-chute supported for vertical reciprocations between the cut-off blade of the stream-controller and the main supply-chute; and means connecting the supplemental chute and stream-controller and operable for simultaneously moving said controller and chute in relatively intersecting planes.

51. In a weighing-machine the combination, of a supply-chute and valve coöperatively connected together; actuating mechanism operatively connected with the valve and chute and embodying means for imparting to said valve and chute unitary movements in relatively intersecting planes and for varying the velocities thereof at different points in the length of said movements.

52. In a weighing-machine the combination, with a main supply-chute and with a stream-controller supported below said main supply-chute, of a supplemental chute having an enlarged upper end telescoping the discharge end of the main supply-chute and supported for vertical movement with its longitudinal axis located at one side the axis of movement of the stream-controller; and actuating means in connection with the stream-controller and supplemental chute and embodying force-modifying means for progressively decreasing the velocities of the stream-controller and chute simultaneously during the closing movement of said controller.

53. The combination, in a weighing-machine, of an oscillatory stream-controller; a stream-controller actuator located at one side the axis of movement of said controller; and a supply-chute pivotally supported on the controller between the actuating means and the axis of movement of said controller.

54. In a weighing-machine the combination, with a framework and with weighing mechanism embodying a bucket, of a stream-controller pivotally supported on the framework; a gravitative actuator in connection with, and having its effective movement at one side the axis of movement of, the stream-controller; a supply-chute pivotally supported substantially midway its width upon a stream-controller between the axis of said stream-controller and the stream-controller actuator and adapted for accelerating the closing movement of said stream-controller.

55. In a weighing-machine the combination, with suitable framework and with weighing mechanism embodying a bucket and with a fixed main supply-hopper located above said bucket, of a stream-controller supported for oscillatory movement on the framework; a cam-faced actuating-lever carried by the stream-controller and having the cam-face thereof located at one side the axis of movement of said controller; a flexible counterweighted actuator pivotally connected to the cam-faced lever and adapted to coöperate with the cam-face of said lever, for imparting to the controller a closing movement of differential velocities; and a supplemental chute supported on the controller at a point between the cam-face and the axis of movement of the actuating-lever.

56. In a weighing-machine the combination, with a supply-chute and with an oscillatory stream-controller, of an arm carried by the stream-controller and having a cam-face located at one side the axis of said controller; and a flexible gravitative actuator pivotally secured to and coöperative with the cam-face of the lever, for imparting to the stream-controller a closing movement having different velocities at different points in the length of such movement.

57. The combination, with a supply-chute, of a stream-controller; and a controller-actuator carried by the stream-controller and comprising two coöperative members, one of which is in the nature of a cam-faced arm having its axis of movement coincident with that of the stream-controller, and the other of which is in the nature of a flexible weight-carrier and is fixed to the upper end of said arm and coöperates with the cam-face thereof, for modifying the velocity of the stream-controller at different stages of its opening and closing movements.

58. In a weighing-machine the combination, with an oscillatory stream-controller; of an oscillatory, cam-faced arm fixed to, and having its axis of movement coincident with that of, the stream-controller; and a gravitative arm-actuator fixed to, and supported on, the cam-faced arm, to have a rolling action over said cam-face to thereby modify the effective force of the cam-arm at successive points in the movement thereof.

59. In a weighing-machine the combination, with a stream-controller supported for oscillatory movement; of an arm fixed to the stream-controller, for movement about an axis coincident with that of said controller and having a peripheral cam-face of gradually-increased radius toward the lower end thereof; and a gravitative flexible actuator fixed to, and depending from the upper end of, said arm and having a coöperative rolling action with the cam-face of said arm, to thereby impart to the controller a closing movement of gradually-decreasing velocity throughout the first stages of such movement and of gradually-increasing velocity throughout the latter stages of such movement.

60. In a weighing-machine the combination, with a stream-controller supported for oscillatory movement; of a controller-actuator fixed to, and having its axis of movement coincident with that of, the stream-controller and comprising a rigid member and a flexible member, the latter of which is fixed to, and has a rolling action upon, the former for advancing the controller to its drip position with a gradually-decreasing velocity and for continuing the advancing movement of said closer beyond its drip position with a gradually-increasing velocity.

61. In a weighing-machine the combination, with weighing mechanism embodying a bucket and with a supply-chute having an oscillatory valve; of a cam-arm movable with, and having its axis of movement coincident to, the valve; a flexible weight-carrier carried on the cam-arm and coöperative with the cam-face thereof, to impart a closing movement to the valve of differential velocity; a stop member carried by the valve; a shiftable regulator-hopper located below the bucket; and a stop member controlled by the regulator-hopper and coacting with the stop member of the valve, for locking said valve in its closed position during the discharge of the load.

62. In a weighing-machine the combination, with weighing mechanism embodying a bucket having two oppositely-disposed front and rear closers separated at their lower adjacent edges by an inverted-V-shaped bottom wall and with means for actuating said closers simultaneously, of a regulator-hopper located below said bucket and comprising two oppositely-disposed pivotally-supported sections having relatively convergent lower walls and adapted to be opened and closed relatively to each other; a link pivotally connected at its opposite ends to opposing hopper-sections in such manner as to insure the opening and closing of both sections when one section is opened or closed; and a counterweighted arm carried by one section and adapted for normally retaining the two sections in their closed positions.

63. In a weighing-machine the combination, with a bucket having an inverted-V-shaped bottom and having two oppositely-disposed front and rear closers and with means for lifting the two closers simultaneously above and away from the lower edge of the V-shaped bottom; of a regulator-hopper located below the bucket and comprising two oppositely-disposed, pivotally-supported sections having inclined bottom walls so disposed as to form the bottom wall for the hopper which is oppositely disposed relatively to the bottom wall of the bucket; and connecting and actuating means for normally retaining the hopper-sections in their relatively-closed positions and for facilitating a simultaneous opening movement of said sections on the passage of material thereto to the hopper from the bucket.

64. In a weighing-machine the combination, with weighing mechanism embodying a bucket, of a regulator-hopper located below the bucket and comprising two oppositely-disposed and pivotally-supported sections; a link pivotally connected at one end of one section above the pivotal point thereof and pivotally connected at its opposite end at its section below the pivotal point of said section; and a weighted arm carried by one section and effective for simultaneously closing the two sections.

65. In a weighing-machine the combination, with a bucket mechanism; of a regulator-hopper located below said mechanism and comprising two sections pivotally supported to have opening and closing movements relatively to each other and each section having a bottom wall which is inclined downward toward the adjacent section, and which bottom wall has an angularly-disposed extension at the lower end thereof; a link pivotally connecting the two sections in such manner as to facilitate simultaneous opening and closing movements thereof; and a weighted arm carried by one section, for normally retaining the two sections in their closed positions.

FRANCIS H. RICHARDS.

Witnesses:
FRED. J. DOLE,
F. N. CHASE.